A. R. SCHOENKY.
STOP MECHANISM.
APPLICATION FILED MAR. 29, 1915.
1,222,331.
Patented Apr. 10, 1917.
3 SHEETS—SHEET 1.
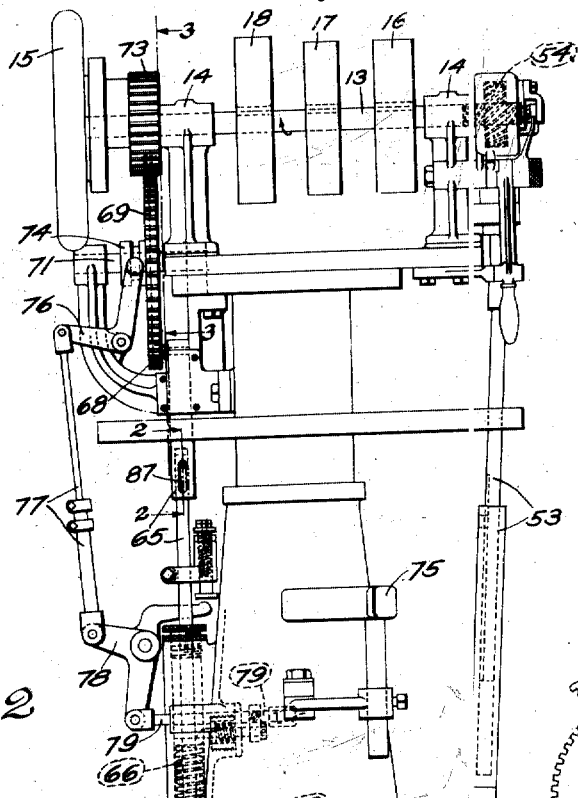
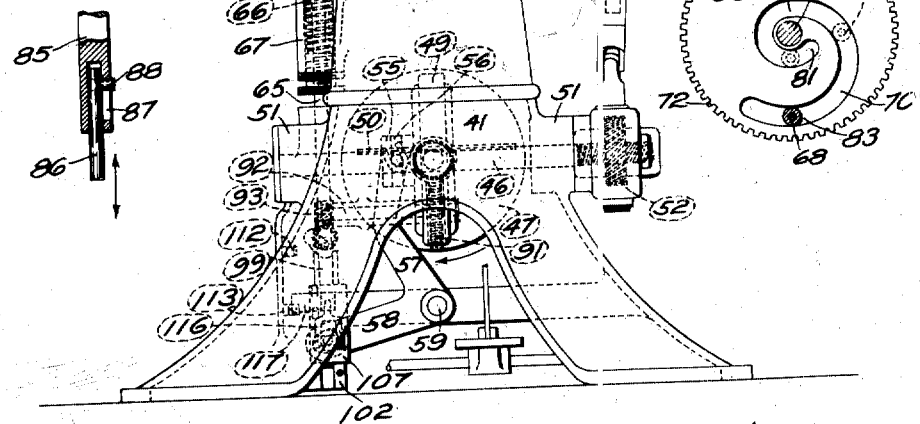
Witnesses,
E. Bernhardt
A. Lawson
Inventor.
August R. Schoenky,
by Rogers, Kerr & Campbell,
his Atty's

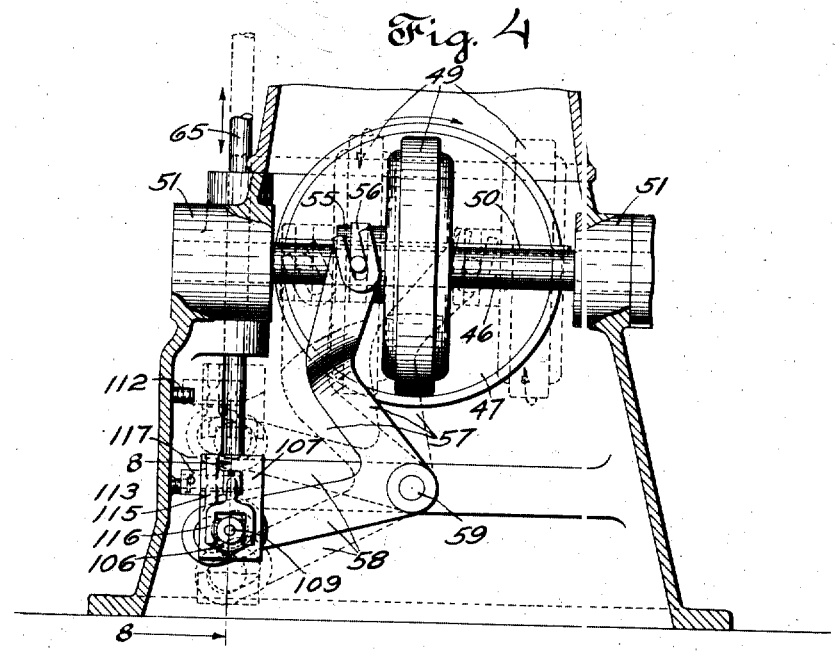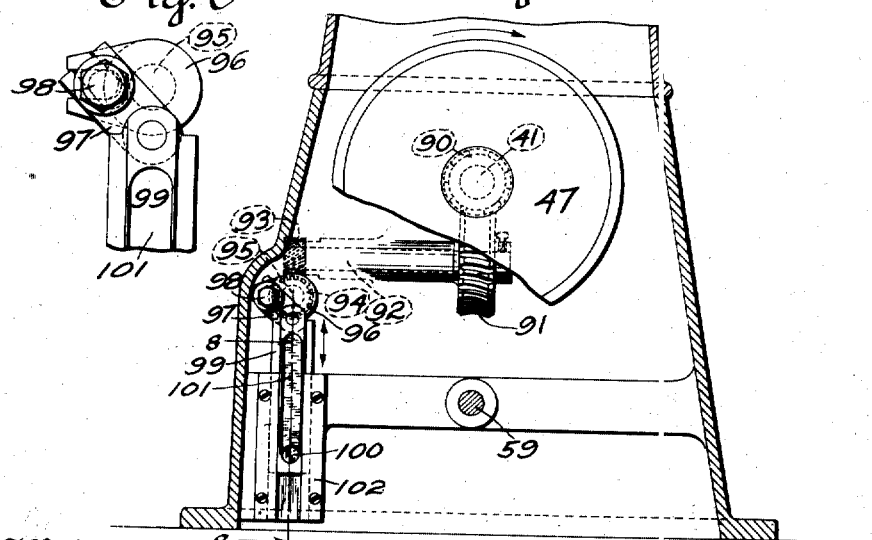

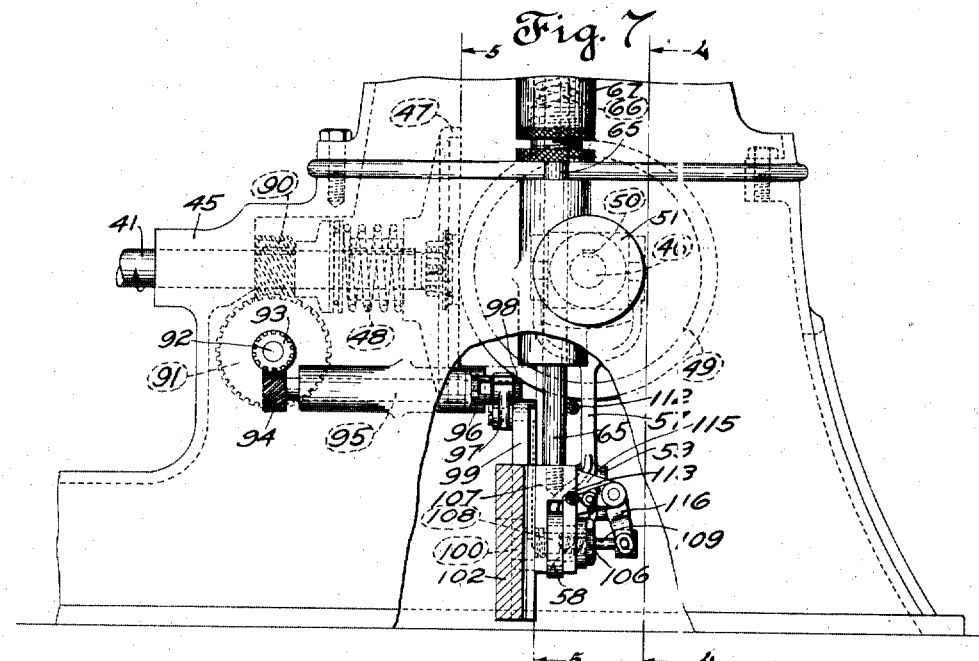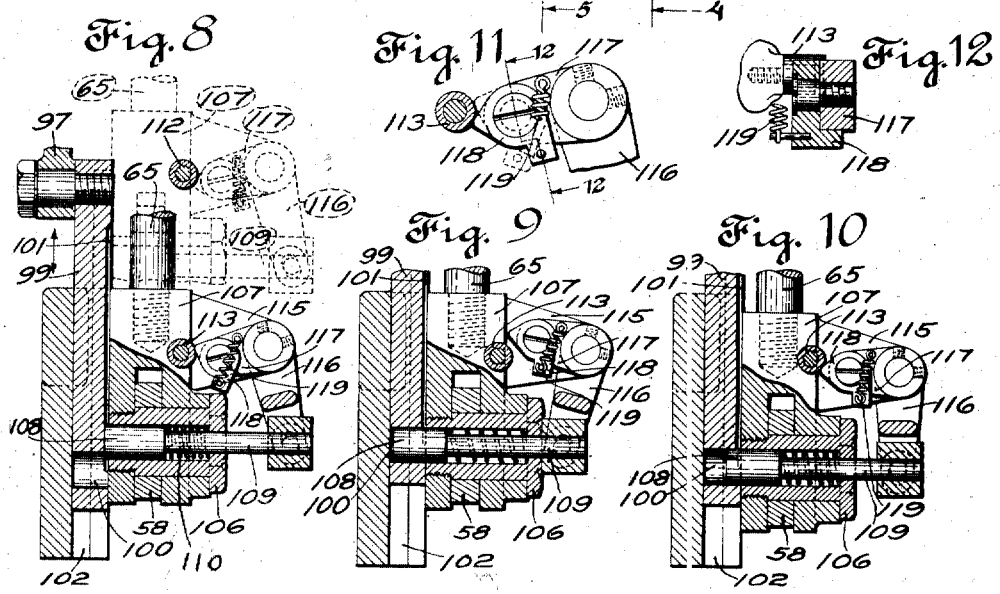

UNITED STATES PATENT OFFICE.

AUGUST R. SCHOENKY, OF SOMERVILLE, MASSACHUSETTS, ASSIGNOR TO REECE SHOE MACHINERY COMPANY, OF BOSTON, MASSACHUSETTS, A CORPORATION OF MAINE.

STOP MECHANISM.

1,222,331.     Specification of Letters Patent.     Patented Apr. 10, 1917.

Application filed March 29, 1915. Serial No. 17,590.

*To all whom it may concern:*

Be it known that I, AUGUST R. SCHOENKY, a citizen of the United States, residing at Somerville, in the county of Middlesex and State of Massachusetts, have invented certain new and useful Improvements in Stop Mechanisms, of which the following is a specification, reference being had therein to the accompanying drawing.

This invention relates to stop mechanisms, particularly such as are adapted for the stopping of sewing or other high speed machines. The invention is herein shown for convenience as applied to a type of machine similar to that illustrated in prior Patent 1,085,093 of January 20, 1914, but this is only for the purposes of illustration, as the improvement might be employed in various other types and kinds of machines where its functions would be advantageous.

The general object of the present improvement is to afford a stop mechanism which will give the desired action in an efficient manner free of destructive shocks and securing the desired accurate stoppage in the required manner. A specific object hereof is to provide a mechanism such as to first effect a stoppage of the machine or working shaft in a given position, and thereafter automatically cause the parts to shift, for example, in a reverse direction, to a desired extent or to a desired final stopping position; such action being useful, for example, in a welt sewing machine employed in the manufacture of shoes, where it is frequently desirable to first run the working shaft up to a certain definite point for the completion of the final stitch and then reverse it for a substantial amount, sometimes as far as a half revolution until it arrives at its final stop position, wherein the needle or thread manipulating devices, and other instruments in the machine, are in the necessary or desired position to permit the operation of removing and inserting work or other operations. Other objects and advantages hereof will be elucidated in the hereinafter following description of one form of mechanism in which the present invention may be embodied.

To the attainment of such objects and advantages the present invention consists in the novel devices, features, combinations and arrangements described and illustrated in the following description and the appended drawings.

In the accompanying drawings forming a part hereof, Figure 1 is a front elevation of a machine provided with an embodiment of the present invention; the stitching or other working instrumentalities of such machine being for convenience omitted as constituting *per se* no part of the present invention.

Fig. 2 is a detail section taken on the plane 2—2 of Fig. 1.

Fig. 3 is a detail right elevation, partly in section, on the plane 3—3 of Fig. 1.

Fig. 4 is a front elevation of the mechanisms at the lower end of the machine, the machine post or casing being sectioned on the plane 4—4 of Fig. 7.

Fig. 5 is a front elevation, partly in section, on the plane 5—5 of Fig. 7.

Fig. 6 is an enlarged detail of the adjustable crank device of Fig. 5.

Fig. 7 is a left elevation of the lower parts of the machine with the casing partly broken away to more clearly show the interior.

Fig. 8 is a left elevation of certain of the parts by which the reversing motion is controlled, taken partly in section, upon the plane 8—8 of Figs. 4 or 5; this figure showing in dotted lines the normal running condition of the parts, and in full lines their position at the time the forward or first stoppage of the machine is effected.

Fig. 9 is a view similar to Fig. 8, but showing the parts in a different position, the reversing action about to commence.

Fig. 10 is a view similar to Figs. 8 and 9 showing the position of the parts when nearly adjusted to the final or second stopped condition.

Fig. 11 is an enlarged detail of a part of Fig. 10, the dotted lines corresponding to the Fig. 8 position.

Fig. 12 is a detail section on the plane 12—12 of Fig. 11.

Certain general elements of the machine will first be referred to. The machine is assumed to be power-operated, and the constantly running part through which the power is delivered for the purposes of the machine conveniently takes the form of, and will be referred to, as a shaft. This driving or power shaft may be provided with belt pulleys to maintain it running at the proper speed. Preferably in the same frame with the power shaft is the running member from which the stitching or other operations of the machines are effected. This conveniently takes the form of, and will be referred to, as a shaft. This driven or working shaft is not constantly running, but rotates or rests idle according to whether the stitching or other operations are proceeding or not. Transmitting connections extend from the power shaft to the working shaft, and these are of such nature that during the constant rotation of the power shaft the working shaft may be rotated or stopped. According to the present invention the transmitting connections between the two shafts include a variable speed transmitter which is shown of the face friction type, but might be of other equivalent types. This transmitter is capable of adjustment from a position which causes rotation of the working shaft at full speed through its intermediate adjustments to a zero or neutral position, at which no driving is effected, and beyond to a minus or reverse adjustment whereby, for the special purposes herein explained, the working shaft may be caused to reverse its direction of rotation. Means for effecting the stoppage of the machine is included, namely, by the shifting of the variable speed transmitter to its neutral position, and this preferably is automatically controlled, for example, from the working shaft itself or a member which operates in unison therewith, so that, upon rendering the stopping connections operative, the working shaft will effect the necessary adjustments to bring about its own stoppage in an efficient and accurate manner to the desired first or forward stopping position of the shaft. In addition to these elements the present invention contemplates employment of means capable of acting independently of the working shaft, or after that shaft has been brought to its first stoppage, for causing the variable speed transmitter to be adjusted for a comparatively brief period of time to a minus or reverse position, and thence back to a neutral or inoperative position, thus bringing about a slight reversal, perhaps one-half of a revolution in extent of the working shaft. The extent of reverse movement is accurately determinable by the reverse speed produced and the period of reverse movement. In this way the principal object of the present improvement is effected.

The specific construction of the illustrated mechanism for carrying out the described purposes set forth will now be described in detail. The vertical post, legs, etc., constituting the machine frame, need no specific description.

At the upper part is shown the rotating shaft 13 constituting the driven or working shaft of the machine. The shaft has fixed bearings 14 near each end, and at its left end a hand wheel 15. From shaft 13 the stitching or other operations may be effected, for example, by shaft cams indicated at 16, 17 and 18.

The power shaft 41, which may have fast and loose belt pulleys or other means of power rotation, is horizontally arranged in a fore-and-aft direction near the base of the machine in bearings, one of which, 45, is shown.

The transmitting connections between the power shaft and the working shaft may be of various types and constructions, but, as shown, they comprise a variable speed transmitter incorporated for convenience as follows. A cross shaft 46 and the power shaft 41 support the two members of a face friction gear constituting the variable speed transmitter. Thus the friction disk 47 is carried at the forward end of the power shaft and is rotated thereby while forced forwardly to hold the face of the disk in contact with the periphery of a friction wheel 49 mounted on the cross shaft 46 and splined thereto. This arrangement enables the friction wheel 49 to be shifted laterally across the face of the power-driven disk. It may stand at the periphery of the disk as shown in dotted lines at the right-hand side of Fig. 4. This will effect full speed running of the machine. Or it may be shifted across the face of the disk from the periphery to the center or neutral point, as shown in full lines in Fig. 4, in which adjustment no driving power is transmitted to the working shaft, but, on the contrary, the friction disk and wheel serve to hold the shaft against rotation. Or it may be shifted beyond the center to a minus or reverse position, as shown in dotted lines at the left of Fig. 4, in which position a reverse rotation of the working shaft will be effected. In some cases the present invention might be constituted of a different sort of transmitter having forward, neutral and reverse adjustments.

The remainder of the transmitting connections between the power and working shafts may be as follows: The cross shaft 46 carrying the friction wheel 49 has bearings 51 near its ends, and is shown extending beyond the right-hand bearings to where it is provided with a helical gear 52 engaging a similar gear at the lower end of an upright transmitting shaft 53, which latter at its upper end similarly engages a helical gear 54 at the right end of the working shaft 13. A disconnecting device shown near the upper end of shaft 53 *per se* forms no part of the present improvement, and, being made the subject of claim in another application, need not be described herein.

With the described parts adjusted for full speed it will be apparent that the working shaft 13 will rotate uniformly and continuously during the normal operations of the machine, for example, stitching around a shoe, until the stopping means hereinafter referred to is applied, whereupon the working shaft will be brought to rest while the power shaft continues in rotation.

The face friction gear 47, 49 is used herein as an important element of the stop mechanism. At the proper time for stoppage of the machine the wheel is shifted in a regular way from the periphery to the center of the disk, so as to reduce the driving power gradually to nothing, giving an easy and shockless stoppage, accompanied by the increasing retarding effect of the disk upon the wheel, resulting in a harmonious coöperation in the action so as to readily and advantageously effect stoppage. The stoppage, moreover, is effected in a predetermined manner, so as to afford a definite position of stoppage for the working shaft, as is required. This is effected herein by a definitely controlled shifting or adjustment of the face friction gear. Indeed, the adjustment is effected from the working shaft itself through connections which are normally inoperative during the shaft's rotation, but adapted when brought into action to effect the shifting of the friction wheel to its neutral position in a definite manner and so as to necessarily secure, at the point of stoppage, the desired shaft position.

The details of the connections by which the variable speed transmitter is thus automatically adjusted to neutral position will now be referred to. It is preferred that such connections be normally disconnected, but adapted to be reconnected at suitable times, for example, at will. The friction wheel 49, which is splined on the cross shaft 46, is provided with a double collar 55 engaged by a ring 56 having studs engaged by the slotted extremity of the upwardly extending arm 57 of a bell crank lever, whose slotted lateral arm 58 may be shifted for shifting the wheel. The lever 57, 58, is fulcrumed at 59 to the frame. The extremity of arm 58 is connected to the lower end of upright rod 65, which extends upwardly nearly to the working shaft. Combined with this rod is a strong spring 66 contained in a barrel 67, which also forms a slideway or bearing for the rod 65, the spring being so arranged as to tend always to lift the rod and to thereby shift the friction wheel 49 from neutral toward full speed position. The upper end of the rod 65 may be pushed downwardly to shift the wheel toward neutral.

The rod 65 may be actuated from the working shaft by the following further connections: The upper extremity of the rod has a follower or roll 68 adapted to coöperate with stopping cam 69 which is in the form of a disk having a groove 70, whose shape is best shown in Fig. 3. The cam and follower are adapted to be engaged and disengaged, namely, by the longitudinal shifting of the cam along the shaft 71, on which it rotates. When the cam and follower are engaged, the rotation of the cam forces the follower down, so as to adjust the face friction gear to neutral position. For rotating the cam its periphery is formed as a gear by reason of teeth 72 which engage with a gear 73 mounted directly on the working shaft 13. As seen in Fig. 1, the arrangement of the gear is such as to permit the horizontal shifting of the toothed cam or gear 69, 72 during rotation. The gear 73 is shown as half the diameter of the toothed gear 69, so that the working shaft may make one complete rotation for one-half rotation of the cam during the slowing down action caused by the shifting of the friction wheel toward neutral. As will be clear from Fig. 3, a half rotation of the cam disk will serve to force the follower and rod completely down, so that the stoppage of the working shaft is effected during one rotation thereof.

The engagement and disengagement of the cam 69 and follower 68 may be effected at will by the following connections: The cam disk is provided with a grooved collar 74, through which the axial shifting movements may be effected, for example, from a knee lever 75 fulcrumed at the front of the machine frame. The connections between the collar 74 and the knee lever include a bell crank 76 engaged with the collar, a rod 77, a second bell crank 78 at the foot of the rod, and a horizontal slide 79 between the last named bell crank and the knee lever. With this arrangement, when the operator moves his knee to the right, the disk or cam 69 is moved to the right and, as soon as its groove 70 is engaged by the follower 68, the shape of the groove controls the action and proceeds to force downwardly the follower, so as to shift the face friction gear to zero adjustment, thus effecting a quiet and easy stoppage with the working shaft always in a definite position.

The preferred shape of cam groove 70 is shown in Fig. 3. The inner portion of the groove from its extremity 81 to the point 82 is concentric to assist the entry of the stud into the groove. The groove is thereafter steadily eccentric from the point 82 for a half revolution to the point 83. An additional concentric portion beyond the point 83 may be for convenience provided. The point 83, corresponding with the neutral position of the face friction gear, represents the point at which the working shaft will stop, because that part of the cam groove will always be engaged with the follower 68 in the stopped adjustment.

Substantially the parts above referred to by number are similar to the parts in my aforesaid prior patent.

As has been before explained, a certain extra or additional shaft movement, after the original stoppage, is to be desired, this preferably being a slight reverse rotation of the working shaft, and it is effected herein by a reverse or minus adjustment of the face friction gear, that is, beyond its neutral position. One feature of the present mechanism, therefore, is a contrivance permitting the friction wheel 49 to be shifted leftwise beyond the center of the friction disk at the proper time without interfering with or obstructing the operations of the parts at other times. It will be remembered that the described mechanism for stopping the forward shaft rotation is operated through the descent of vertical slide rod 65 controlled by cam 69. The cam pushes the rod down. I have provided a contrivance which, while not interfering with this action of the cam, permits the rod to be extended or pushed farther downward an extra distance in order to force the friction wheel beyond its neutral position. Thus, in Figs. 1 and 2, the rod 65 is shown as constituted of two abutting or telescoping portions 85 and 86, the sleeve portion 85 being slotted at 87 and the portion 86 having a pin 88 engaged in the slot. This arrangement, while keeping the two rod portions in alinement and while insuring that the descent of the upper portion will force down the lower portion, further permits the lower portion to be independently forced down to the extent that the pin 88 may travel in the slot 87. In conjunction with this device I have combined, as will next appear, a controlled means for causing an extra descent of the rod portion 86 or an extra movement of the friction wheel beyond neutral, in a definite predetermined manner, to secure in the working shaft the desired extent of reverse rotation after the first or forward stoppage of the shaft.

The means for thus briefly causing the shifting of the friction wheel to a reverse adjustment and back to neutral might be effected in various ways, and the reverse and return adjustments might be differently effected; but for the purpose of greater reliability and certainty of action I prefer to effect both such movements by the power of the power shaft 41. To this end I have provided a constantly moving or oscillating device driven by the power shaft, whether or not the working shaft be in operation, and in connection therewith means for at the proper time coupling or engaging the constantly oscillating device with the friction wheel to produce a brief excursion of the latter to and from the left-hand or reverse side of the friction disk. A convenient construction and mode of operation of the oscillating device may be as follows (see particularly Figs. 5 and 7): A worm 90 on the power shaft 41 drives a worm wheel 91 at reduced speed. The shaft 92 carrying the worm wheel has a second worm 93, which engages a worm wheel 94 at the rear end of the shaft 95, which, at its forward end, is provided with a crank 96, at whose extremity is pivoted a connecting link 97. There is an adjusting stud 98 for determining the radius, and therefore the throw, of the crank. The link extends between the crank and a constantly oscillating member or slide 99. This is the oscillating member, which, at the proper time, is to bring about the brief reverse adjustment of the face friction gear already referred to. The slide 99 is provided with a recess 100 adapted to receive a bolt at certain times, and is formed with a shallow depression 101 at its forward side. The slide is mounted to reciprocate vertically in a fixed slideway 102.

The oscillating slide 99 is located adjacent to the lower end of the vertical rod 65 and to the extremity of the bell crank arm 58, which connects with that rod. At certain times the slide and the arm are to be briefly coupled together, so as to cause an extra descent of the arm and rod, and, therefore, a reverse or left-hand adjustment of the friction wheel beyond its neutral position. The details of the control parts by which this result is attained are best shown in Figs. 7 to 12. Fig. 4 shows in full lines the neutral position of the parts and in dotted lines the two extreme positions, namely, for the forward and reverse drive. When the machine has been stopped in its forward motion and the friction wheel has thus come to the neutral or zero position and the other parts in Fig. 4 assume the full line position shown, the present improvement comes into play, acting at the extremity of the arm 58 to throw the parts to the indicated extreme reverse position and back again to neutral position.

The fulcrum or stud 106 connecting the arm 58 with the rod 65, or rather with the oblong block 107 provided at the foot of the rod, is shown as hollow in construction, so as to contain a coupling device or bolt 108. The slotted extremity of arm 58 is engaged in a slot or kerf in the block 107 and straddles the hollow stud 106, so that the arm and rod always move together.

The purpose of the bolt 108 within the fulcrum stud 106 is to effect at the proper time a locking engagement between the power oscillated slide 99 on the one hand and the rod and arm, which are joined by the hollow stud, on the other hand, so that through the arm the oscillation of the slide may effect the required reversal of the variable speed transmitter. The bolt 108 is provided with a stem 109 surrounded by a spring 110 confined between the bolt and the head of the hollow stud, so that the bolt tends to move toward the slide 99 and to enter the bolt recess 100 therein. The depressed portion 101 of the oscillating slide 99 is for the purpose of normally relieving the slide of the rubbing action and noise of the bolt.

In the normal running of the machine the bolt 108 is held outwardly so as to be inoperative, as indicated in the dotted lines in Fig. 8.

The control of the bolt as to whether it is operative or inoperative is effected by coöperating parts, some carried up and down with the block 107 and others stationarily located. The stationarily located parts include a pair of studs or rolls, 112 above and 113 below, as seen in front view in Fig. 4, and in cross-section in Figs. 7 to 11. The parts that travel with the block 107 include a small elbow lever pivoted on an extension 115 of the block, and having a yoked downwardly extending portion 116 pivotally engaged at its extremity with the outer end of the stem 109 of bolt 108, and a laterally extending arm 117 coöperating with the rolls 112, 113. The engaging portion or extremity of the arm 117 of the elbow lever is provided with a latch 118 acted upon by a spring 119, which tends to hold it in its normal position, shown in dotted lines in Fig. 8 and full lines in Figs. 9, 10 and 11, but allowing it to be shifted to the abnormal position shown in full lines in Fig. 8 and in dotted lines in Fig. 11.

These described parts, arranged as shown in the drawings, may operate substantially as follows: When in normal running adjustment all of the parts connected with rod 65 and arm 58 are in their elevated position shown in dotted lines in Figs. 4 and 8. The latch 118 has contacted beneath the upper roll 112, which has caused the swinging of the elbow lever and thereby the complete outward withdrawal of the bolt 108, so that the up-and-down oscillation of the power-actuated slide 99 has no effect. It will be understood that the slide 99 oscillates vertically between the extreme upward position shown in Fig. 9 and an extreme lower position materially below that to any convenient distance; and its movement is slow rather than rapid, owing to the reduction gears for driving, and so as to avoid too abrupt a reversing action.

When the machine is brought to its first stopping position by the adjustment of the transmitter to zero, the arm 58, rod 65 and connected parts descend from the dotted lines to the full line position of Fig. 8. During this descent, the latch 118 being out of contact with the roll 112, permits the bolt spring to assert itself, so that the bolt is pressed toward the oscillating slide 99 and engages in the depression 101 therein as it descends. In this descent it cannot engage the bolt recess 100 because the latter does not rise sufficiently high. As shown, the extreme upward position of the bolt recess and the normal downward position of the bolt correspond. In Fig. 8 the machine has stopped and the bolt has reached its downward position, but the bolt recess is not yet in register with it.

The continued movement of the slide 99 quickly brings the bolt recess opposite to the bolt, whereupon the bolt springs into the recess, as shown in Fig. 9. At this moment the reversing action is about to commence, since the downward movement of the slide 99 will carry with it the bolt 108 and the bell crank arm 58, which effects the shifting of the transmitter to reverse position. In this stage or position of the parts, the latch 118 has not yet reached the lower roll 113.

The descent of the slide now proceeds to force downwardly the rod 65 and arm 58, causing the friction wheel to make an excursion into and from the left-hand or reverse portion of the friction disk of the transmitter. This travel of the wheel into and from the minus area of the wheel is predetermined and is invariably the same in extent of time and distance, since the oscillating movements of the slide 99 are always the same. During the downward movement of the parts the latch 118 snaps past the lower roll 113.

On the upward movement of the parts, as the friction wheel returns toward zero, the reverse drive is being slowed down. As the parts near the end of their ascent, the latch 118 comes in contact beneath the lower roll 113. The continued upward movement causes the roll to react on the latch so as to throw the elbow lever and retract the bolt. Fig. 10 shows the parts in this stage, the bolt being partly retracted.

At the completion of the upward movement, that is, when the friction wheel has returned to its neutral position, the bolt has been completely retracted from the bolt recess and thereby disengaged from the oscillating slide. As the parts pass into this condition, the latch 118 does not pass by the roll 113, but remains in contact against it, as seen in full lines in Fig. 11. This, therefore, represents the normal condition of the parts when the machine is idle. They remain thus until the restarting of the machine.

As before stated the restarting of the machine is effected by throwing knee lever 75 to the left. This action throws the disk or control cam 69 to the left, thus disengaging it from the follower 68. Upon such disengagement, the strong spring 66 comes into play to force upwardly the rod 65 and follower 68, at the same time swinging the bell crank arm 58 and forcing the friction wheel to the periphery of the disk of the transmitter, so as to cause full speed driving. With this ascent of the rod and arm the latch 118 passes the lower roll 113, thus releasing the elbow lever 116, 117 from the roll and permitting the parts, when full speed adjustment has been attained, to resume their normal running condition, as illustrated in dotted lines in Fig. 8.

The described stop mechanism may be referred to as comprising, in combination with the power shaft and the working shaft of the machine, the following coöperating elements; a means for causing power-drive of the working shaft, namely, both of forward and reverse drive, including a face friction transmitter or analogous transmitter adapted to progressive adjustment from full speed through its intermediate speeds to zero and reverse adjustments; a main stopping mechanism adapted to discontinue the drive and stop the shaft in a suitable position, that is, to discontinue the forward drive by effecting the controlled shifting of the transmitter to zero; and mechanism operative automatically upon such stoppage for causing power-drive of the shaft for a suitable extent and in a given direction, namely reversely, so as to give a suitable final position, this additional drive being caused by a brief adjustment of the transmitter to its reverse position, and this action being initiated when the shaft has been brought to its first or forward stopped position.

It will thus be seen that I have described a machine attaining the objects and advantages hereof. While I have described the same in detail, the main principles and features of the improvement may be embodied in various forms, and different details, so that I do not wish to be restricted to features or details excepting as set forth in the appended claims.

I claim—

1. A stop mechanism comprising in combination with the working shaft of the machine, transmitting means for causing power-drive of the shaft forwardly or reversely, a main stopping mechanism adapted to discontinue the drive and stop the shaft in a suitable position, and means put into action automatically by the adjustment of the stopping mechanism to stopping adjustment for causing power-drive of the shaft for a suitable extent in a reverse direction, said means comprising a power-driven constantly moving but normally inoperative device adapted to be rendered operative upon the stoppage of forward drive to briefly adjust said transmitting means for reverse driving.

2. A stop mechanism comprising in combination with a power shaft and the working shaft of the machine, a power transmitter adapted to forward, reverse or stopping adjustments, a main stopping mechanism adapted to adjust the transmitter to zero and stop the shaft, and means put into action automatically by the adjustment of the transmitter to zero for causing power-drive of the shaft for a suitable extent in a reverse direction, said means comprising a power-driven constantly moving but normally inoperative device adapted to be rendered operative upon the stoppage of forward drive to briefly adjust said transmitting means for reverse driving.

3. A stop mechanism comprising in combination with a power shaft and the working shaft of the machine, a face friction gear or analogous power transmitter between said shafts having full speed, intermediate and stopping adjustments, connections for automatically progressively adjusting said transmitter to zero to stop the shaft in a suitable position, and means put into action automatically by the adjustment of the transmitter to stopping adjustment for causing the temporary adjustment of the transmitter to driving adjustment and thereby causing the power-drive of the shaft for a suitable extent in a suitable direction.

4. A stop mechanism comprising in combination with a power shaft and the working shaft of the machine, a face friction gear or analogous power transmitter between said shafts having full speed, intermediate and stopping adjustments, connections for automatically progressively adjusting said transmitter to zero to stop the shaft in a suitable position, and means put into action automatically by the adjustment of the transmitter to stopping adjustment for causing the temporary adjustment of the transmitter to driving adjustment and thereby causing the power-drive of the shaft for a suitable extent in a suitable direction; said means comprising a constantly oscillating adjusting member normally inoperative but adapted to be coupled to adjust the transmitter when the shaft is stopped.

5. A stop mechanism comprising in combination with a power shaft and the working shaft of the machine, a face friction gear or analogous power transmitter between said shafts having full speed, intermediate, stopping and reverse adjustments, connections for automatically progressively adjusting said transmitter to zero to stop the shaft in a suitable position, a constantly-oscillating normally-inoperative adjusting member, and a coupling device adapted, when the transmitter has attained zero adjustment, to couple said member and thereby effect a brief adjustment of the transmitter to and from reverse adjustment.

6. A stop mechanism comprising in combination with a power shaft and the working shaft of the machine, a face friction gear or analogous power transmitter between said shafts having full speed, intermediate, stopping and reverse adjustments, connections for automatically progressively adjusting said transmitter to zero to stop the shaft in a suitable position, a constantly-oscillating normally-inoperative adjusting member, and a coupling device adapted, when the transmitter has attained zero adjustment, to couple said member and thereby effect a brief adjustment of the transmitter to and from reverse adjustment, and a tripping device for uncoupling said member after such reverse adjustment.

7. A stop mechanism comprising in combination with a power shaft and the working shaft of the machine, a face friction gear or analogous power transmitter between said shafts having full speed, intermediate, stopping and reverse adjustments, connections from said working shaft operative at suitable times for automatically progressively adjusting said transmitter to zero to stop the shaft in a suitable position, a device tending to restore said transmitter to forward adjustment, said connections and restoring device being such as to permit the transmitter to be adjusted to reverse after stoppage, and means put into action automatically by the adjustment of the transmitter to stopping adjustment for causing the temporary adjustment of the transmitter to reverse adjustment and thereby the power-drive of the shaft for a suitable extent in a reverse direction.

8. A stop mechanism comprising in combination with a power shaft and the working shaft of the machine, a face friction gear or analogous power transmitter between said shafts having full speed, intermediate, stopping and reverse adjustments, connections from said working shaft operative at suitable times for automatically progressively adjusting said transmitter to zero to stop the shaft in a suitable position, a device tending to restore said transmitter to forward adjustment, said connections and restoring device being such as to permit the transmitter to be adjusted to reverse after stoppage, a constantly-oscillating normally-inoperative adjusting member, and a coupling device adapted, when the transmitter has attained zero adjustment, to couple said member and thereby effect a brief adjustment of the transmitter to and from reverse adjustment.

9. A stop mechanism comprising in combination with the working shaft of the machine, means for causing power-drive of the shaft, including a face friction or analogous transmitter adapted to progressive adjustment from full speed through intermediate speeds to zero adjustment and reverse, a main stopping mechanism adapted to effect the controlled shifting of said transmitter to zero adjustment and stop the shaft in a suitable position, and mechanism operative automatically upon such stoppage for causing a brief adjustment of said transmitter to reverse to thereby drive the shaft for a suitable extent in a reverse direction.

10. A stop mechanism comprising in combination with the working shaft of the machine, a progressively variable speed transmitter adapted to be adjusted to its zero adjustment for progressively slowing and stopping the shaft, and means automatically operable upon such stopping for briefly adjusting the transmitter slightly from and back to its zero adjustment for effecting a predetermined additional drive of the shaft.

11. A stop mechanism comprising in combination with the working shaft of the machine, a progressively variable speed transmitter adapted to be adjusted to its zero adjustment for progressively slowing and stopping the shaft, and means automatically operable upon such stopping for briefly adjusting the transmitter slightly from and back to its zero adjustment for effecting a predetermined additional drive of the shaft in the reverse direction.

12. A stop mechanism comprising in combination with the working shaft of the machine, a progressively variable speed transmitter adapted to be adjusted to its zero adjustment for progressively slowing and stopping the shaft, means whereby said shaft controls such adjustment to effect its own stoppage in a predetermined position, and means automatically operable upon such stopping for briefly adjusting the transmitter slightly from and back to its zero adjustment for effecting a predetermined additional drive of the shaft in the reverse direction.

13. A stop mechanism comprising in combination with the working shaft of the machine, a progressively variable speed transmitter, means for automatically adjusting said transmitter to its zero adjustment for progressively slowing and stopping the shaft in a definite position, and means automatically operable upon such stopping for effecting a predetermined extent of reverse drive of the shaft.

14. A stop mechanism comprising in combination with the working shaft of the machine, a progressively variable speed transmitter, means for automatically adjusting said transmitter to its zero adjustment for progressively slowing and stopping the shaft in a definite position, and means automatically operable upon such stopping for briefly adjusting the transmitter reversely slightly from and back to its zero adjustment for effecting a predetermined extent of reverse drive of the shaft.

15. A stop mechanism comprising in combination with the working shaft of the machine, power driving connections including a progressively variable speed transmitter, and means automatically operable upon the stopping of the shaft's forward rotation for briefly adjusting the transmitter slightly from and back to its zero position for effecting a predetermined reverse drive of the shaft.

16. A stop mechanism comprising in combination with the working shaft of the machine a progressively variable speed transmitter adapted to be adjusted from full speed through intermediate adjustments to zero or stopping adjustment, and therebeyond to reverse driving adjustment, and automatic means for effecting the adjustment of said transmitter to progressively slow down and stop the shaft and thereupon briefly reversely drive it.

17. A stop mechanism comprising in combination with the working shaft of the machine a progressively variable speed transmitter adapted to be adjusted from full speed through intermediate adjustments to zero or stopping adjustment, and therebeyond to reverse driving adjustment, driven shaft controlled means for effecting the adjustment of said transmitter to progressively slow down and stop the shaft, and automatic means for thereupon briefly reversing the transmitter to reversely rotate the shaft.

18. A stop mechanism comprising in combination with the working shaft of the machine, power connections for driving the shaft forwardly, a progressively variable speed transmitter included in said connections, means controlled by the working shaft for automatically causing the shaft to stop at a predetermined point in its forward rotation, and means operative upon the shaft attaining such predetermined stopping point for automatically causing a predetermined extent of reverse drive by reversing the adjustment of said transmitter.

19. A stop mechanism comprising in combination with the working shaft of the machine, power connections for driving the shaft, such connections comprising a transmitting means which is progressively adjustable to vary the speed through all intermediate speeds, and means for automatically causing adjustment of such transmitting means to progressively decrease the forward drive of the shaft until the shaft comes to a temporary stop at a predetermined position in its forward rotation, and to then cause a predetermined fraction of a rotation of reverse drive to a predetermined final shaft position, and to thereupon finally stop the shaft.

In testimony whereof, I have affixed my signature in presence of two witnesses.

AUGUST R. SCHOENKY.

Witnesses:
THOMAS J. CARTY,
FREDERICK W. DAVISON.